Sept. 30, 1947.    N. B. HEDLEY ET AL    2,428,217
ADJUSTABLE SEAT
Filed June 17, 1944    4 Sheets-Sheet 1
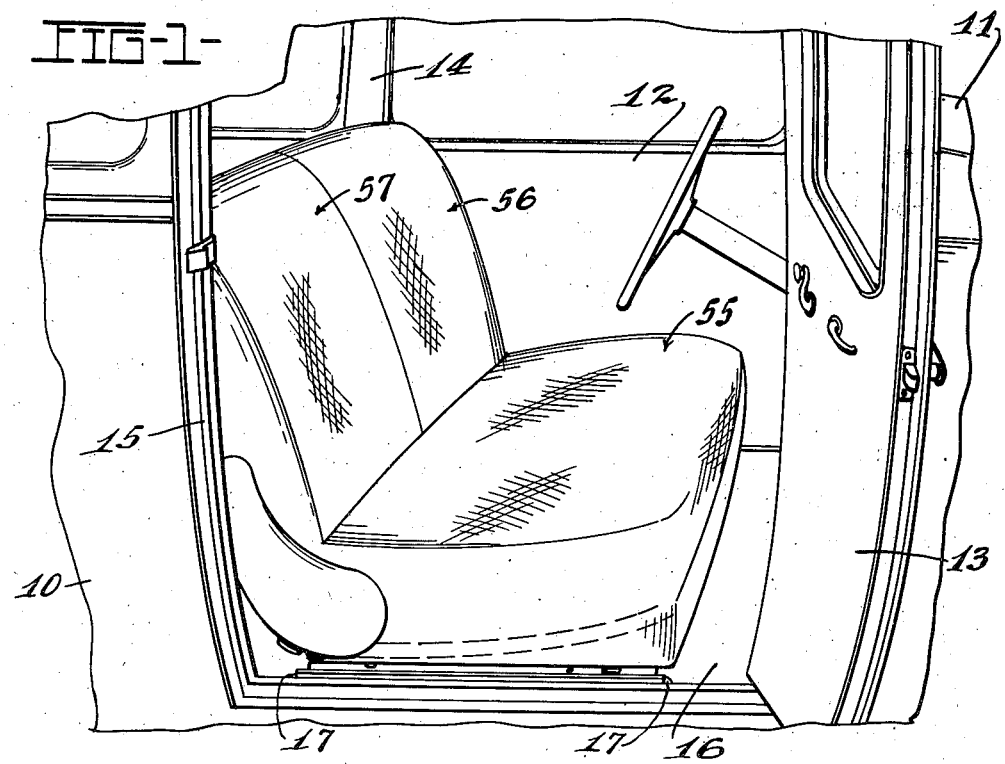
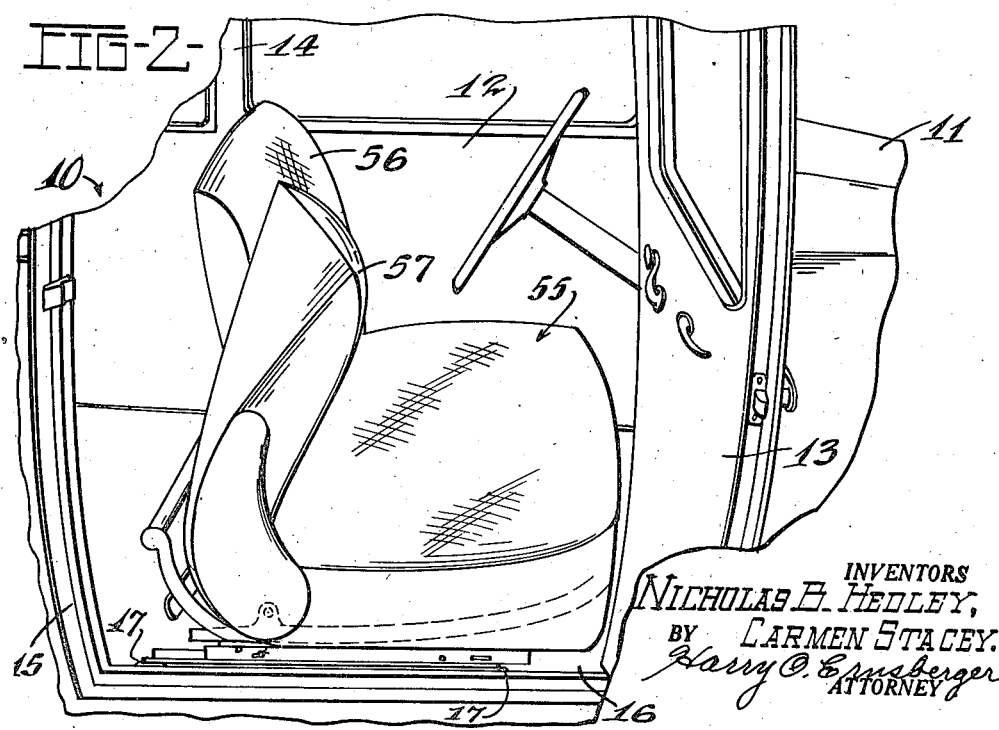
INVENTORS
*Nicholas B. Hedley,*
BY *Carmen Stacey.*
*Harry O. Ernsberger*
ATTORNEY

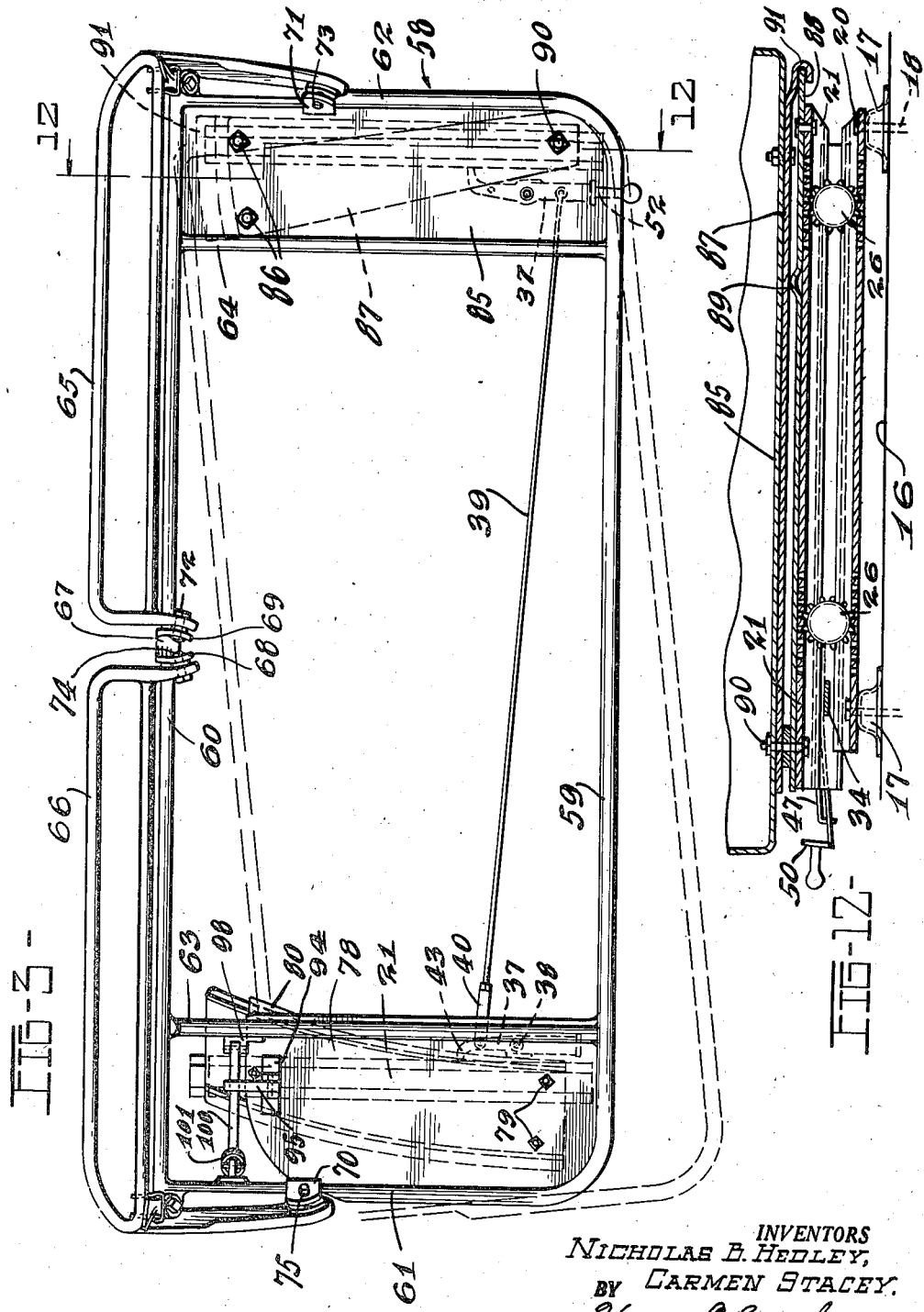

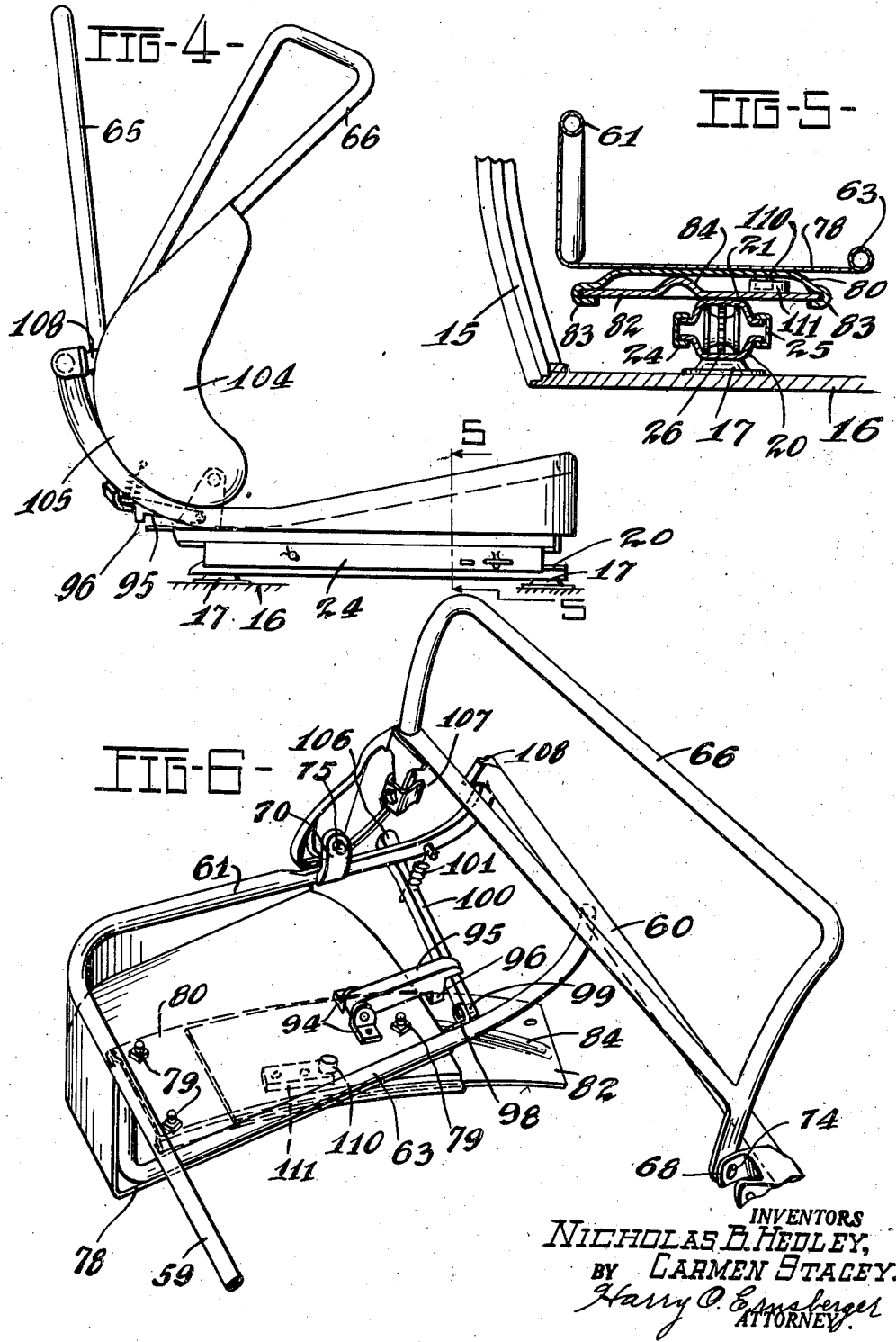

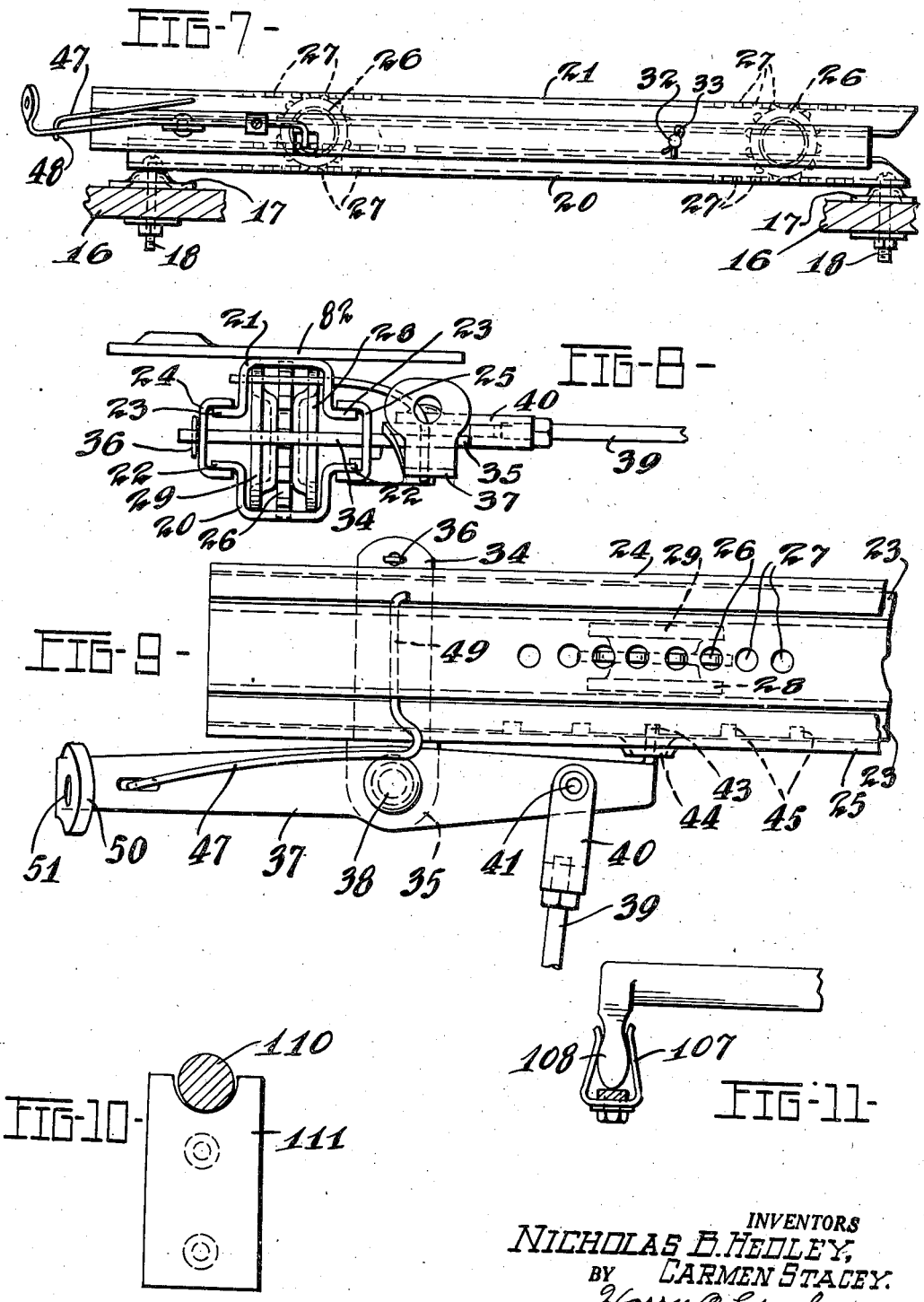

Patented Sept. 30, 1947

2,428,217

UNITED STATES PATENT OFFICE 2,428,217

ADJUSTABLE SEAT

Nicholas B. Hedley and Carmen Stacey, Toledo, Ohio, assignors to Willys-Overland Motors, Inc., Toledo, Ohio, a corporation of Delaware Application June 17, 1944, Serial No. 540,820

8 Claims. (Cl. 155—5)

This invention relates to seat construction and more especially to adjustable seats for use in vehicle bodies.

With particular reference to the seating arrangement and construction of a four or five passenger vehicle having front and rear seats in combination with a single door opening on each side of the vehicle, difficulty is encountered in affording adequate clearance space for the ingress and egress of passengers to and from the rear seat compartment. An object of the present invention is to provide an adjustable front seat arrangement for a vehicle body in which a seat back section and seat arrangement associated therewith are movable to positions providing ample clearance for passengers to enter or leave the rear seat compartment through the front door opening.

Another object of the invention is to provide a vehicle body seat which is pivotally arranged for horizontal swinging movement in combination with a tiltable seat back section which may be swung out of normal position with respect to the seat portion and whereby the seat back section is movable independently relative to the swinging movement of the seat portion.

A further object of the invention is to provide a swingable front seat for a vehicle body having a pivoted back section arranged whereby the back section in normal position of use effects a locking of the seat portion in its normal position, and wherein initial pivotal movement of the back section releases the locking means, the seat portion and back section after release of the locking means being arranged for relative independent movement.

Still another object of the invention is the provision of a swingable seat portion and a tiltable back section for the front seat arrangement of an automobile arranged to permit passengers to enter or leave the rear seat compartment, and provides an arrangement which is longitudinally slidable or adjustable to facilitate the vehicle operator's position with respect to the vehicle controls.

Still another object is to provide a front seat construction for a vehicle body which may be swung in a substantially horizontal plane and which may be secured in normal position or released for swinging movement by a simple initial manipulation of a tiltable back section forming a part of the seat construction.

Other objects and advantages are within the scope of this invention, such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred in which:

Figure 1 is a perspective view of a portion of a vehicle body showing a front seat construction of our invention therein and disposed in normal passenger carrying position;

Figure 2 is a view similar to Figure 1 illustrating the seat arrangement of our invention as moved to a position increasing the clearance space for access to the rear seat compartment;

Figure 3 is a top plan view of a seat and seat back skeleton frame construction;

Figure 4 is an end view of the seat portion and back section, the latter in tilted position;

Figure 5 is a detail sectional view taken substantially on the line 5—5 of Figure 4;

Figure 6 is a fragmentary perspective view illustrating a locking means and seat supporting construction forming a part of the present invention;

Figure 7 is an elevational view showing a means of supporting the seat construction for a lengthwise adjustment of the seat with respect to the vehicle;

Figure 8 is an enlarged end elevational view of the elements shown in Figure 7;

Figure 9 is an enlarged top plan view of a portion of the construction illustrated in Figure 7;

Figure 10 is a detail view showing the stop means for limiting the relative swinging movement of the seat construction;

Figure 11 is a detail view showing the means for retaining the tiltable back section in normal position;

Figure 12 is a sectional view taken substantially on the line 12—12 of Figure 3.

While we have illustrated the seat construction of our invention embodied in a passenger vehicle of a type having a single door at each side with which our invention has particular utility, it is to be understood that the invention may be used with any arrangement wherein a seat construction of our invention may be found desirable.

Referring to the drawings in detail and first to Figures 1 and 2, the vehicle body 10 has a cowl portion 11, front doors 12 and 13 arranged in opposite side walls of the body, the compartment illustrated being that for the driver or vehicle operator, the doors 12 and 13 cooperating in closed position with pillar posts 14 and 15. Supported upon the floor 16 of the vehicle are pedestals or brackets 17 which are secured to the floor board by means of bolts 18, there being four of the brackets arranged in sets of two each adjacent each door opening of the vehicle. Mounted upon each set of brackets 17 and arranged longitudinally of the vehicle is a means for slidably adjusting the seat construction as a unit fore and aft of the vehicle to adjust the position of the seat for the convenience of the vehicle operator. This means is inclusive of generally channel-shaped members 20 and 21, the lower channels 20 being mounted directly upon the floor board brackets 17 and are also held in place by means of the bolts 18. Both sets of channels 20 and 21 have laterally extending flanges 22 and 23 which are adapted to be engaged by auxiliary channel members 24 and 25 for the purpose of maintaining each set of channel members 20 and 21 in operative relationship as illustrated in Figure 7.

Disposed between the bight portions of each of channel members 20 and 21 of each set are toothed wheels 26 which engage in sets of openings 27 formed in each of the channel members 20 and 21. Welded to the sides of each toothed wheel 26 are dished discs 28 and 29 which form anti-friction means or rollers for supporting the channel 21 upon its related channel 20 to facilitate longitudinal movement of channels 21 with respect to channels 20.

The auxiliary channels 24 and 25 are secured together adjacent one end by means of a pin 32 and cotter keys 33 and by means of flat bar 34 disposed near the forward ends of the channel members. The bar 34 is provided with an enlarged portion 35 which abuts the exterior surface of channel 25, the opposite end of bar 34 being provided with an opening to receive a retaining or cotter key 36 for securing bar 34 in proper position. Pivoted upon the projecting portion 35 of each bar 34 by means of a rivet 38 is a member 37, there being two of the bars 37 each being supported respectively near the forward portion of its channel assembly. The members 37 are connected together by means of a rod 39, clevis 40 and pivot pins 41. Each of members 37 is provided with a tooth or pawl 43 which projects through an opening 44 in channel 25 and is adapted for cooperation with a series of recesses 45 formed in flange 22 of each of the channel members 20. Thus engagement of pawl 43 with any pair of recesses 45 serves to lock the seat construction in an adjusted position with respect to bodily lengthwise movement thereof relative to the vehicle body. A spring member 47 has a portion 48 which extends through an opening in member 37, and a portion 49 extending through openings in the channel 21, the tension of said spring being such as to resiliently urge members 37 in directions such as to normally engage pawls 43 in recesses 45 formed in the flange 22 of each channel 20. Each of the members 37 is formed at its forward extremity with an upwardly extending ear portion 50 having a threaded opening 51 to accommodate a threaded tenon of a handle 52 as shown in Figure 3. This handle provides a means for directly manipulating one of the members 37, and through the medium of rod 39 and associated elements, to manipulate the other of the locking members 37. While both members 37 are formed with projections 50, a handle 52 is ordinarily affixed to only one of the members 37, but they are fabricated in this manner so that the operating handle 52 may be disposed at either side of the seat construction as may be desired.

The seat construction proper is inclusive of a seat or seat bottom portion 55 and divided seat back portions or sections 56 and 57. The seat 55 and back sections 56 and 57 are of a conventional upholstered type, the seat portion being mounted or constructed upon a skeleton tubular metal frame 58 having spaced parallel portions 59 and 60 and connecting end portions 61 and 62. The bars 59 and 60 are connected together by reinforcing tubular members 63 and 64 which are welded to the bars 59 and 60. The seat back sections 56 and 57 are constructed upon skeleton metal frames 65 and 66.

Positioned between the back section frames 65 and 66 and welded to the seat frame member 60 is a bracket 67 having projecting portions 68 and 69. Welded to each of the seat frame end bars 61 and 62 are upwardly extending brackets 70 and 71. Projections 69 and 71 are provided with aligned openings to receive and accommodate pivot pins 72 and 73 which form pivotal supports for the seat back frame 65. Due to the angular relationship of the axis of pivot pins 72 and 73 with respect to the position of seat frame member 60, a forward tilting movement of seat back 65 as viewed in Figure 3 will cause the seat back frame to pivot about an angularly disposed axis passing through pivot pins 72 and 73. Projections 68 and 70 are, in like manner, provided with openings to receive pivot pins 74 and 75 carried by the seat back frame 66, these pins forming an angularly disposed axis about which the seat back frame 66 may pivot forwardly. Due to the angular relation of the axis passing through pins 74 and 75 with respect to the seat back frame member 66, the latter will be moved into a position with respect to the seat frame and seat as illustrated in Figures 2, 4 and 6. As shown in Figure 2, such pivotal movement of the seat provides additional space for ingress and egress of passengers to and from the back seat (not shown) of the vehicle.

This pivotal action of seat back 57 increases the space for ingress and egress of passengers, but in order to provide ample space, our invention is inclusive of means for swinging or hinging the seat portion 55 about a pivotal axis. To this end a plate or member 78 is welded or otherwise secured to seat frame member 61 and reinforcing tube 63. Secured to plate 78 by means of bolts 79 is a second plate or member 80. Welded or otherwise secured to the upper surface of one of the channels 21 is a plate or member 82, each side portion of member 80 being configurated to channel shaped contour as at 83 to overtake the opposite edge portions of plate 82 as shown in Figure 5.

The opposite end of the seat frame is provided with a plate 85 welded or otherwise secured to frame member 62 and reinforcing bar 64. Plate 85 is secured by means of bolts 86 to a second plate 87 which is mounted upon a member 88, the latter being secured to upper channel member 21 of the assembly supporting this end of the seat frame. As shown in Figures 3 and 12 adjacent the forward portion of the seat frame is a bolt 90 passing through plates 85, 87, 88 and the bight portion of one of the channels 21, the bolt 90 forming a vertical pivotal axis about which the seat frame and associated parts are permitted to pivot or swing so that the left hand portion of the seat frame may be moved forwardly to the position indicated in dotted lines in Figure 3.

The rear edge of plate 87 terminates in a channel shaped configuration 91 overtaking the rear edge of the plate 88 to prevent disassembly of these plates and permit relative sliding movement therebetween.

The edges of the plate 82 are of arcuate configuration being generated about the axis of pivot 90 as a center. The channel shaped configurations 83 of plate 80 are also of arcuate shape and take over the edges of plate 82 to secure the plates in assembled relationship yet permitting slidable relative movement therebetween. The plate 82 is formed with a raised rib or boss 84 and plate 88 is formed with a raised rib boss 89 which form bearing surfaces engageable respectively with plates 80 and 87 and serve to minimize friction between these slidable members.

It is highly desirable that the seat construction be secured in normal position except when the same is swung forwardly to facilitate the ingress or egress of passengers. To this end we have provided locking means manipulated by initial tilting movement of the seat back frame 66 for effecting the release of the locking means. Welded to the upper surface of plate 78 is a pair of L-shaped members or brackets 94 upon which is pivoted a locking pawl or latching means 95, the latter having a downwardly extending catch or projection 96 normally adapted to take over the rear edge of plate 82 as shown in Figure 4 to thereby prevent forward pivotal motion of the seat frame 58. Welded to the reinforcing bar 63 is an L-shaped bracket 98 to which is pivoted, as at 99, a bar or releasing member 100, a biasing means or contractile spring 101 connecting bar 100 to frame member 61 to normally urge the bar 100 to its uppermost position. In this position the bar 100 engages and lifts the latch means 95 so that projection 96 is out of alignment with the rear edge of plate 82. With the latching means and associated elements in this position, the seat frame 58 is free to be swung or pivoted about the axis of the bolt 90.

An end plate or abutment member 104 secured to the seat back frame 66 is formed with an arcuate lower edge surface 105 which is adapted for engagement with a projecting pad portion 106 forming an integral extension upon bar 100. When the seat back frame 66 is pivoted or swung in a counter-clockwise direction as viewed in Figure 4, the surface 105 engages pad 106 to move bar 100 downwardly about the pivot point 99, thus permitting the latch 95 to swing to a position where the dog or catch 96 will be in a position to engage the rear edge of plate 82 and lock the seat and seat frame 58 against pivotal movement when the seat back frame 66 is in its normal upright position.

The member 104 is provided with a spring clip 107 and the frame member 60 is provided with a projection 108 adapted to resiliently interengage or lock with clip 107 to yieldingly retain the seat back frame 66 in its normal upright position. The resiliency of the clip 107 may be readily overcome by slight forward manual pressure upon the seat back frame 66 to disengage the clip from projection 108, further forward pivotal movement of seat back frame 66 permitting the bar 100 to move upwardly under the influence of spring 101 thus moving the catch 96 away from the plate 82. With the elements in this position the seat portion 55 and frame 58 may be freely swung about the axis of bolt 90 so as to provide ample space between the seat and the door pillar post 14 for ingress and egress of passengers to and from the rear seat of the vehicle. From the foregoing description it will be obvious that a relatively slight or initial forward tilting of seat frame 66 will disengage the latch pawl 96 from plate 82 and that thereafter the seat 55 and frame 58 may be swung about the bolt 90. The seat back frame 66 may be returned to its normal position of use irrespective of the relative position of the seat, 55, as the cam surface 105 engaging projection 106 will merely depress bar 100 away from the latch means 95 so that the lower surface of the latch 96 will ride upon the upper surface of plate 82 and will not lock the seat against further pivotal movement until the seat is returned to its normal position of use. In order to limit the forward swinging movement of the seat, a lug or abutment 110 is welded to the plate 78 and extends downwardly therefrom into the path of a cleat 111 fixed to plate 82 as particularly shown in Figure 6. The engagement of abutment 110 with the cleat 111 serves to limit the maximum forward swinging movement of the seat 55 about the pivot 90.

It is apparent that, within the scope of the invention, modifications and different arrangements may be made other than is herein disclosed, and the present disclosure is illustrative merely, the invention comprehending all variations thereof.

What we claim is:

1. A seat structure for a vehicle body, in combination, a pair of seat supporting channel members, a plate secured to each of said channel members; a seat frame; an element secured to said seat frame adjacent each end thereof and adapted to respectively engage the plates secured to said channel members; one of the elements carried by said seat frame being pivoted to the adjacent plate secured to one of said channel members whereby said seat structure is adapted for horizontal swinging movement about said pivot; a seat back pivoted to said seat frame and arranged for pivotal movement about an axis out of parallelism with the seat frame; means for locking said seat frame to one of said plates; and means operable upon slight pivotal movement of said seat back relative to said seat frame for releasing said locking means; interengageable means formed on said elements and cooperating with said plates for maintaining said elements and plates in assembled relationship and permitting relative slidable movement thereof; and abutment means arranged between an element and its adjacent plate for limiting the horizontal swinging movement of said seat structure.

2. A seat structure for a vehicle body including in combination, a pair of spaced supports; a seat frame pivotally mounted on one of said supports for rotational movement in a horizontal plane; a seat back pivotally mounted upon said seat frame; a latching means carried by said seat frame and arranged for engagement with the other of said supports for restraining rotational movement of said seat; a relatively movable member mounted upon said seat frame engageable with said latching means; means associated with said member for normally urging said latching means out of engagement with the seat frame support, said seat back being formed to engage said member when said seat back is in normal position whereby said latching means may engage the adjacent support to restrain horizontal movement of said seat frame when the latter is in normal position of use.

3. A seat structure for a vehicle body including in combination, a seat frame; a pair of spaced supports upon which said seat frame is mounted; said seat frame being pivotally connected to one of said supports for rotational movement in a horizontal plane; a seat back pivotally mounted upon said frame; a seat locking means carried by said seat frame and engageable with the other of said supports to lock the seat in normal position of use; a relatively movable member carried by said seat and engageable with said locking means for rendering said locking means effective or ineffective dependent upon the position of said member; said seat back having means engageable with said member when said seat back is in normal position of use for rendering said locking means effective and means rendered effective upon slight pivotal movement of said seat back from normal position for biasing said locking means out of seat locking position.

4. A seat structure for a vehicle body including in combination, a pair of spaced supports; a seat mounted upon said supports and pivotally connected to one of said supports; said seat being arranged for rotation in a horizontal plane about said pivotal axis; a back section pivotally mounted upon said seat; locking means for said seat including a latching pawl carried by said seat and engageable with the other of said supports for locking the seat in normal position of use; an arm pivotally mounted upon said seat and engageable with said latching pawl; means associated with said arm and normally biasing said latching pawl away from seat locking position; a cam surface formed on said back section and engageable with said pivoted arm for controlling said locking means; said back section, pivoted arm and cam surface being arranged whereby slight pivotal movement of the seat back away from its normal position of use and relative to said seat effects a release of said locking means.

5. A seat structure for a vehicle body, in combination, a pair of seat supporting channel members, a plate secured to each of said channel members; a seat frame; an element secured to said seat frame adjacent each end thereof and adapted to respectively engage the plates secured to said channel members; each of said elements having a configuration overtaking an edge of said plates, one of the elements carried by said seat frame being pivoted to the adjacent plate secured to one of said channel members whereby said seat frame is adapted for horizontal swing movement about said pivot; a seat back pivoted to said seat frame and arranged for pivotal movement about an axis out of parallelism with the seat frame; means on said seat frame for locking said seat frame to the other of said plates, a movable, spring-urged releasing element supported on said seat frame and engageable with said locking means for releasing the same; and a part carried by said seat back adapted to engage said releasing element to hold it out of engagement with said locking means, when said seat back is in its normal position of use, whereby upon initial pivotal movement of said seat back relative to said frame said seat back brings said part carried thereby out of engagement with said releasing element, the spring-urged releasing element then moving into engagement with said locking means thereby releasing the same from the other of said plates, so that said seat frame can be swung about said pivot.

6. A seat structure for vehicle body; the combination of supporting means; a seat mounted upon said supporting means and pivotally connected thereto for rotation about a substantially vertical axis; a seat back section being supported for pivotal movement about an axis angularly disposed with respect to the axis of rotative movement of the seat independently of the relative position of said seat; locking means including a movable latch element carried by said seat and engageable with said supporting means for maintaining said seat in its normal position of use, a releasing member movably mounted on said seat and engageable with said latch element and biasing means tending to move said releasing member into engagement with said latch element and thereby to move the same out of engagement with said supporting means; an abutment member attached to said seat back section and engageable with said releasing member, said abutment member engaging said releasing member to hold it against the force of said biasing means out of engagement with the latch element, when said seat back section is in its normal position of use, and upon initial pivotal movement of said seat back section away from its normal position of use, said abutment member disengaging from said releasing member, said biasing means then moving said releasing member into engagement with said latching element and moving the same out of engagement with said supporting means.

7. A seat structure for a vehicle body including in combination, supporting means; a seat pivotally mounted on said supporting means and arranged for rotation in a substantially horizontal plane about a fixed axis; a back section pivotally mounted upon said seat; locking means including a locking pawl carried by said seat and engageable with said supporting means for locking the seat in normal position of use, a releasing member for said locking pawl movably supported upon said seat and engageable with said locking pawl and biasing means tending to move said releasing member into engagement with said locking pawl for releasing the same and means formed on said seat back section engaging said releasing member to hold it against the force of said biasing means out of engagement with said locking pawl when said seat back section is in its normal position of use, slight pivotal movement of said seat back section away from its normal position of use and relative to said seat bringing said means formed on said seat back section out of engagement with said releasing member, said releasing member then moving under influence of said biasing means into engagement with said locking pawl thereby releasing the same from said supporting means.

8. A seat structure for vehicle body; the combination of supporting means; a seat pivotally mounted upon the supporting means and arranged for rotation about a substantially vertical axis; a seat back section supported upon said seat and pivotally movable about an axis angularly disposed with respect to the axis of rotation of said seat; said seat back section being arranged for pivotal movement about its axis independently of the relative position of said seat; locking means including a relatively movable pawl carried by said seat and engageable with said supporting means for maintaining said seat in normal position, a spring-actuated releasing member movably carried by said seat and engageable with said pawl, when said seat back section is moved pivotally away from its normal position of use; and a part carried by said seat back section engageable with said releasing member, said part having such configuration that in the normal position of use of said seat back section said part engages and moves said spring-actuated releasing member out of engagement with said locking pawl and thereby releases said locking pawl to engage said supporting means, when said seat is in its normal position of use, and upon initial pivotal movement of said seat back section relative to said seat, permits said spring-actuated releasing member to engage and hold said locking pawl out of engagement with said supporting means.

NICHOLAS B. HEDLEY.
CARMEN STACEY.

REFERENCES CITED

The following references are of record in the file of this patent:

UNITED STATES PATENTS

| Number | Name | Date |
|---|---|---|
| 2,189,396 | Greig | Feb. 6, 1940 |
| 2,132,729 | Galamb et al. | Oct. 11, 1938 |
| 1,942,070 | Smeeker | Jan. 2, 1934 |
| 2,256,023 | Harmon | Sept. 16, 1941 |